Jan. 5, 1954   M. C. POOLE   2,665,180
EXTENSIBLE TABLE FOR HOUSE TRAILERS
Filed March 6, 1950
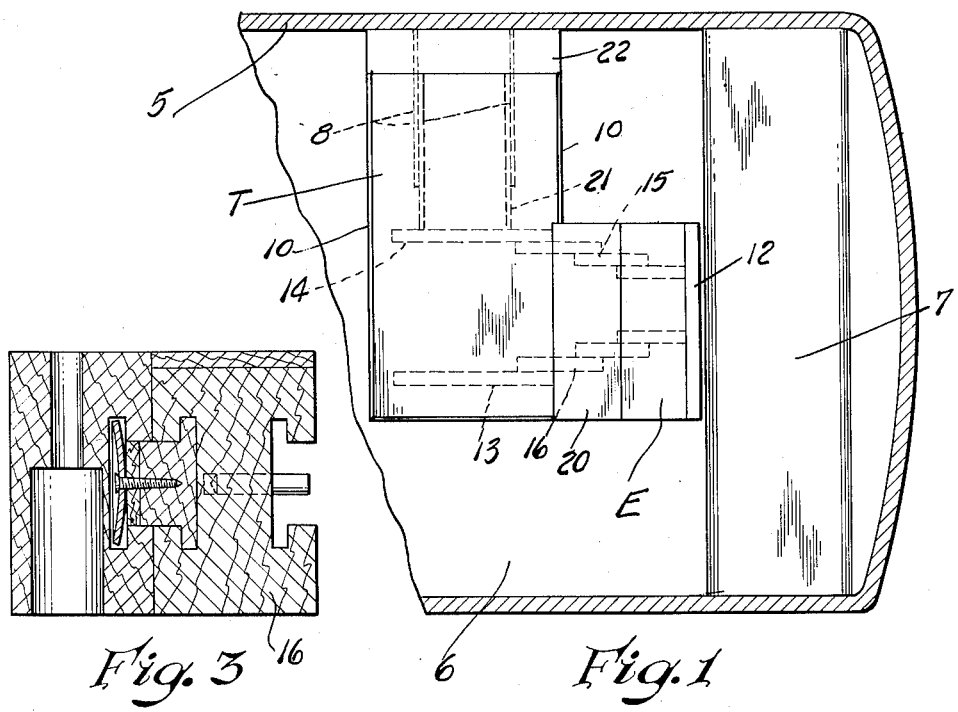
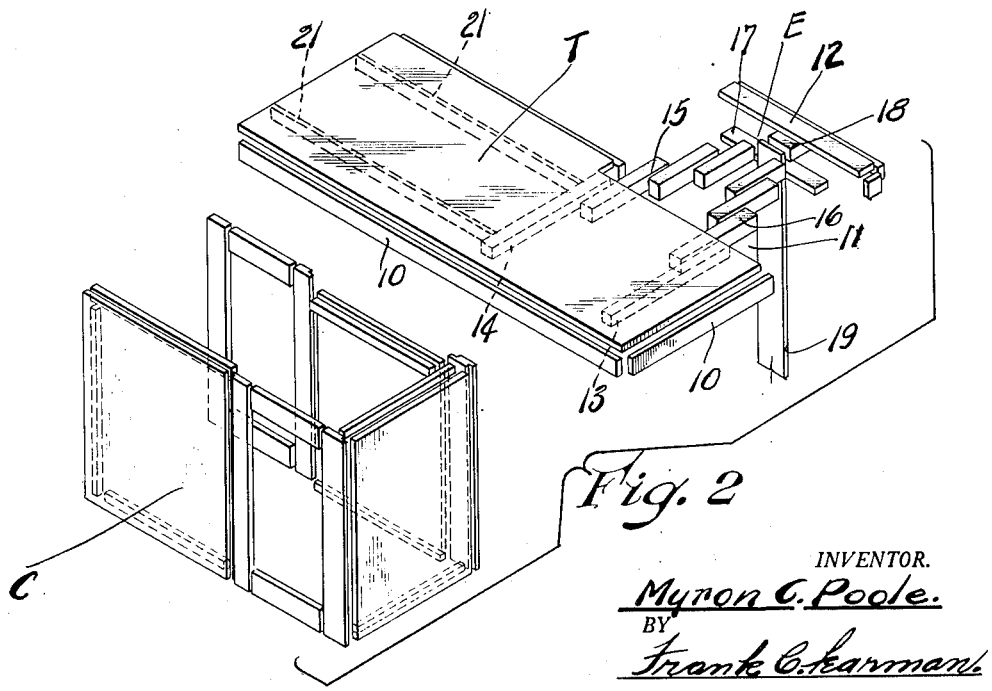
INVENTOR.
Myron C. Poole.
BY
Frank C. Kearman.
ATTORNEY Patented Jan. 5, 1954

2,665,180

UNITED STATES PATENT OFFICE 2,665,180

EXTENSIBLE TABLE FOR HOUSE TRAILERS

Myron C. Poole, Bay City, Mich., assignor to Redman Trailer Company, Alma, Mich.

Application March 6, 1950, Serial No. 147,884

1 Claim. (Cl. 311—41)

This invention relates to extensible tables for use in house trailer coaches and the like, and more particularly to a house trailer coach used as a conveyance, home, and/or living quarters.

One of the prime objects of the invention is to design an extensible table which can be easily and quickly extended to accommodate additional persons when serving meals, playing games, or carrying on household duties which require more space than is normally available with tables of conventional trailer coaches.

Another object is to design a very simple, practical, and economical extensible table which can be readily adjusted to extended position, which forms a rigid and substantial structure when extended, and which can, when necessary, be easily and quickly retracted to original size.

A further object is to provide a table structure including quickly removable leaves which form the top of the extensible part of the table, which leaves can be readily stored when not in use.

Still a further object is to design an extensible table of simple, practical and inexpensive construction, which can be readily manufactured, assembled and installed, and in which the one extension folds into and forms a part of the original table when the table is in its retracted position.

With the above and other objects in view, the present invention consists in the combination and arrangement of parts, hereinafter more fully described, illustrated in the accompanying drawing, and more particularly pointed out in the appended claim, it being understood that changes may be made in the form, size, proportion, and minor details of construction, without departing from the spirit, or sacrificing any of the advantages of the invention.

In the drawings:

Fig. 1 is a fragmentary, sectional, plan view of a trailer body with my table shown in position therein and in extended position.

Fig. 2 is a perspective, exploded view showing the table support, table top, and extensible section with the leaves omitted.

Fig. 3 is an enlarged, transverse sectional view through one of the extensible bars.

The interior of a house trailer coach is usually of limited size, as it is designed to be drawn over the highways, and the marginal dimensions of vehicles traveling over the highway are, of course, governed by State laws; consequently, all furnishings must be compact, and in many instances foldable, so that they may be unfolded or extended when in use, and folded or retracted when not in active use.

A table, of course, is necessary for many uses in a coach trailer, and in the instant application I have shown a trailer body 5, having a floor 6 and a couch 7 with a table T extending from the one side wall of the trailer body, and while in the instant application I have shown the table and couch adjacent each other, it will be understood that this is of no special significance and is a matter of convenience only.

The table support is preferably in the form of a cabinet C; it extends outwardly from the trailer wall as shown, and spaced-apart, horizontally disposed slide members 8 also extend from said side wall within said cabinet and on which the table top T is supported as will be hereinafter described.

The table top T has a depending rim section 10 as shown, and is cut as at 11 to accommodate the end strip 12 of an extensible section E when said extension is in its retracted position.

Guides 13 and 14 are secured to the bottom face of the table top T in any approved manner, and similar pairs of slides 15 and 16 are slidably secured thereto and to each other. A horizontally disposed strip 17 connects the ends of the outer pair of slides, and a strip 18 connects the members 12 and 17, a leg 19 being connected to the strip 17 as shown, and forms a support for the extensible section when it is in extended position, said legs resting flat against the side wall of the cabinet C when the extension is in retracted position, the leaves 20 being readily placed in position or removed when desired.

The top section of the table is also extensible lengthwise and away from the wall of the trailer to which the end of the cabinet is secured, slide sections 21 being provided on the lower face of the table and slidably engage the sections 8, these sections 21 being longitudinally slidable thereon. The table top T is secured to the section bars 21, and when the top is extended, by pulling it away from the wall, the space thus provided is covered by a lose leaf 22, thus increasing the useable area of the table top when desired, and this leaf is readily removable for storage in the cabinet when the top is pushed back to retracted position against the side wall of the trailer.

The leaves of the laterally extending section are also stored in the cabinet base, and the slides 15 and 16 are forced back beneath the top section T so that the end of extensible section fits into the cut-out portion of the main table top, thus forming a complete rectangular-shaped top of desired dimensions. The table is extended only when occasion demands, and provides additional area when required, otherwise, the table is of conventional size and takes up but a very limited space.

From the foregoing description, it will be obvious and I have perfected a very simple, practical and relatively inexpensive extensible table for use in house trailer coaches and similar vehicles and structures.

What I claim is:

In a trailer coach, a stationary cabinet mounted therein with its one end tight against one wall of said coach, spaced apart slide members mounted on said cabinet extending outwardly from said wall, and a table top normally tight against said wall of the coach mounted for endwise, slidable movement on said cabinet away from said wall to permit insertion of an additional table leaf in the space created when the table is adjusted away from said wall, said table having guide members mounted thereunder for slidably engaging the slide members on said cabinet, and a cutout section in the outer portion of the side edge of the adjustable top, spaced-apart, laterally extending guide members secured under said top, the innermost of said members being in engagement with the outer ends of the first-mentioned guide members under said top to engage the outer end of the slide members on the cabinet and prevent marring of the wall of the trailer when the top is pushed inwardly, laterally disposed slide members connected to the lower face of the cut-out section slidably engaging the laterally extending guide members under said top, a supporting leg rigidly connected to said laterally disposed slide members, and removable leaves adapted to rest on the laterally disposed slide members to form additional table area when the said laterally disposed slide members are in extended position.

MYRON C. POOLE.

References Cited in the file of this patent

UNITED STATES PATENTS

| Number | Name | Date |
|---|---|---|
| 238,495 | Erdin | Mar. 8, 1881 |
| 313,768 | Pringle | Mar. 10, 1885 |
| 359,817 | Schmitt | Mar. 22, 1887 |
| 500,440 | Stebbins | June 27, 1893 |
| 665,455 | McGlannery | Jan. 8, 1901 |
| 1,901,347 | Hildebrand | Mar. 14, 1933 |
| 1,942,387 | Wolters | Jan. 2, 1934 |
| 2,162,032 | Rudman | June 13, 1939 |
| 2,532,041 | Thompson | Nov. 28, 1950 |

FOREIGN PATENTS

| Number | Country | Date |
|---|---|---|
| 18,110 | Germany | Aug. 21, 1881 |